(12) United States Patent
Goschy

(10) Patent No.: US 12,140,504 B2
(45) Date of Patent: Nov. 12, 2024

(54) INTRINSICALLY-SAFE SENSOR SYSTEM

(71) Applicant: ExxonMobil Technology and Engineering Company, Spring, TX (US)

(72) Inventor: Patrick E. Goschy, Katy, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 387 days.

(21) Appl. No.: 17/805,500

(22) Filed: Jun. 6, 2022

(65) Prior Publication Data

US 2023/0010626 A1 Jan. 12, 2023

Related U.S. Application Data

(60) Provisional application No. 63/203,117, filed on Jul. 9, 2021.

(51) Int. Cl.
*G01M 3/28* (2006.01)
*G01M 3/24* (2006.01)

(52) U.S. Cl.
CPC .......... *G01M 3/2815* (2013.01); *G01M 3/243* (2013.01)

(58) Field of Classification Search
USPC ........................................................ 73/1.82
See application file for complete search history.

(56) References Cited

U.S. PATENT DOCUMENTS

| | | | | |
|---|---|---|---|---|
| 5,583,764 A | * | 12/1996 | Nail | H02H 9/008 |
| | | | | 702/2 |
| 6,574,652 B2 | * | 6/2003 | Burkhard | H02H 9/008 |
| | | | | 718/1 |
| 10,149,389 B2 | * | 12/2018 | Surinya | H05K 1/186 |
| 11,856,732 B2 | * | 12/2023 | Peters | H01R 31/06 |
| 2011/0120209 A1 | * | 5/2011 | Rose | G01H 11/08 |
| | | | | 73/40.5 A |

* cited by examiner

*Primary Examiner* — Clayton E. LaBalle
*Assistant Examiner* — Warren K Fenwick
(74) *Attorney, Agent, or Firm* — Vorys, Sater, Seymour and Pease LLP

(57) ABSTRACT

An intrinsically-safe sensor system, as well as a method for assembling the intrinsically-safe sensor system and a method for monitoring sound corresponding to a source using the intrinsically-safe sensor system, are provided herein. The intrinsically-safe sensor system includes a number of sensors, including a microphone, as well as a processor for processing sensor data obtained from the sensors. The intrinsically-safe sensor system also includes a memory component for storing the sensor data obtained from the sensors, a power source, a communication connection for communicably coupling the intrinsically-safe sensor system to a remote computing system, and a connector including internal and external connection regions for internally and/or externally connecting one or more additional devices to the intrinsically-safe sensor system on demand. The intrinsically-safe sensor system further includes an enclosure, as well as potting material for encapsulating an internal region of the intrinsically-safe sensor system that resides within the enclosure.

17 Claims, 14 Drawing Sheets

INTRINSICALLY-SAFE SENSOR SYSTEM

CROSS REFERENCE TO RELATED APPLICATIONS

This application claims the priority benefit of U.S. Provisional Patent Application No. 63/203,117, filed Jul. 9, 2021, entitled INTRINSICALLY-SAFE SENSOR SYSTEM, the entirety of which is incorporated by reference herein.

FIELD OF THE INVENTION

The techniques described herein relate to sensors. More particularly, the techniques described herein relate to an intrinsically-safe sensor system that is suitable for use in hazardous zones.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

Many operational areas within the oil and gas industry are classified as hazardous zones. Moreover, when an operational area is classified as a hazardous zone, devices operating within the operational area are required to meet enhanced safety standards to prevent harm to people and equipment in the area. In particular, such devices are typically required to be designed with the capability of preventing explosive conditions from arising due to operation of the devices in the presence of external hazards. Therefore, each new device that is brought into the area must be certified to be operational in the area, meaning that the device meets the enhanced safety standards. This can become particularly burdensome when attempting to utilize sensing devices to monitor conditions of interest within the area, since multiple different types of sensing devices may be needed to monitor all the conditions of interest. Furthermore, in some cases, it may be difficult to locate sensing devices that effectively monitor particular conditions while still meeting the required safety standards.

SUMMARY OF THE INVENTION

An embodiment described herein provides an intrinsically-safe sensor system. The intrinsically-safe sensor system includes a number of sensors, including at least one microphone, a processor for processing sensor data obtained from the sensors, and a memory component for storing the sensor data obtained from the sensors. The intrinsically-safe sensor system also includes a power source, a communication connection for communicably coupling the intrinsically-safe sensor system to a remote computing system, and a connector including an internal connection region for internally connecting an additional device to the intrinsically-safe sensor system and an external connection region for externally connecting another additional device to the intrinsically-safe sensor system on demand. The intrinsically-safe sensor system further includes an enclosure and potting material for encapsulating an internal region of the intrinsically-safe sensor system that resides within the enclosure.

Another embodiment described herein provides a method for monitoring sound corresponding to a source using an intrinsically-safe sensor system. The method includes attaching an intrinsically-safe sensor system to a source for which sound monitoring is desired, where the intrinsically-safe sensor system includes components that are at least partially encapsulated within potting material and contained within an enclosure. The components include, but are not limited to, two or more microphones that are positioned such that the directionality of sound waves recorded by the two or more microphones can be determined. Each microphone is installed within the intrinsically-safe sensor system such that the port of the microphone is aligned with a through hole within the circuit board to which the microphone is attached. An elastomer tubing is compressed between an opening within a wall of the enclosure and the through hole within the circuit board to prevent the port of the microphone from being obstructed by the potting material, and the port of the microphone is acoustically coupled to the source via a metal fastener that extends through the opening within the wall of the enclosure, through the elastomer tubing, and within proximity to the through hole within the circuit board. The method also includes monitoring sound emitted by the source using the two or more microphones, as well as determining the directionality of the sound based, at least in part, on the positioning of the two or more microphones.

Another embodiment described herein provides a method for assembling an intrinsically-safe sensor system. The method includes electrically coupling components of the intrinsically-safe sensor system to a circuit board. The components include, but are not limited to, a number of sensors, including at least one microphone, a processor for processing sensor data obtained from the sensors, a memory component for storing the sensor data obtained from the sensors, a power source, a communication connection for communicably coupling the intrinsically-safe sensor system to a remote computing system, and a connector including an internal connection region for internally connecting an additional device to the intrinsically-safe sensor system and an external connection region for externally connecting another additional device to the intrinsically-safe sensor system on demand. The method also includes attaching the circuit board including the components to an inside wall of an enclosure and then determining whether the intrinsically-safe sensor system functions properly using a test fixture. If the intrinsically-safe sensor system does not function properly, the method further includes repairing the intrinsically-safe sensor system and repeating the determination of whether the intrinsically-safe sensor system functions properly using the test fixture. Alternatively, if the intrinsically-safe sensor system does function properly, the method further includes encapsulating an internal region of the intrinsically-safe sensor system that resides within the enclosure using potting material.

These and other features and attributes of the disclosed embodiments of the present disclosure and their advantageous applications and/or uses will be apparent from the detailed description which follows.

BRIEF DESCRIPTION OF THE DRAWINGS

To assist those of ordinary skill in the relevant art in making and using the subject matter thereof, reference is made to the appended drawings, wherein.

Figure 1:
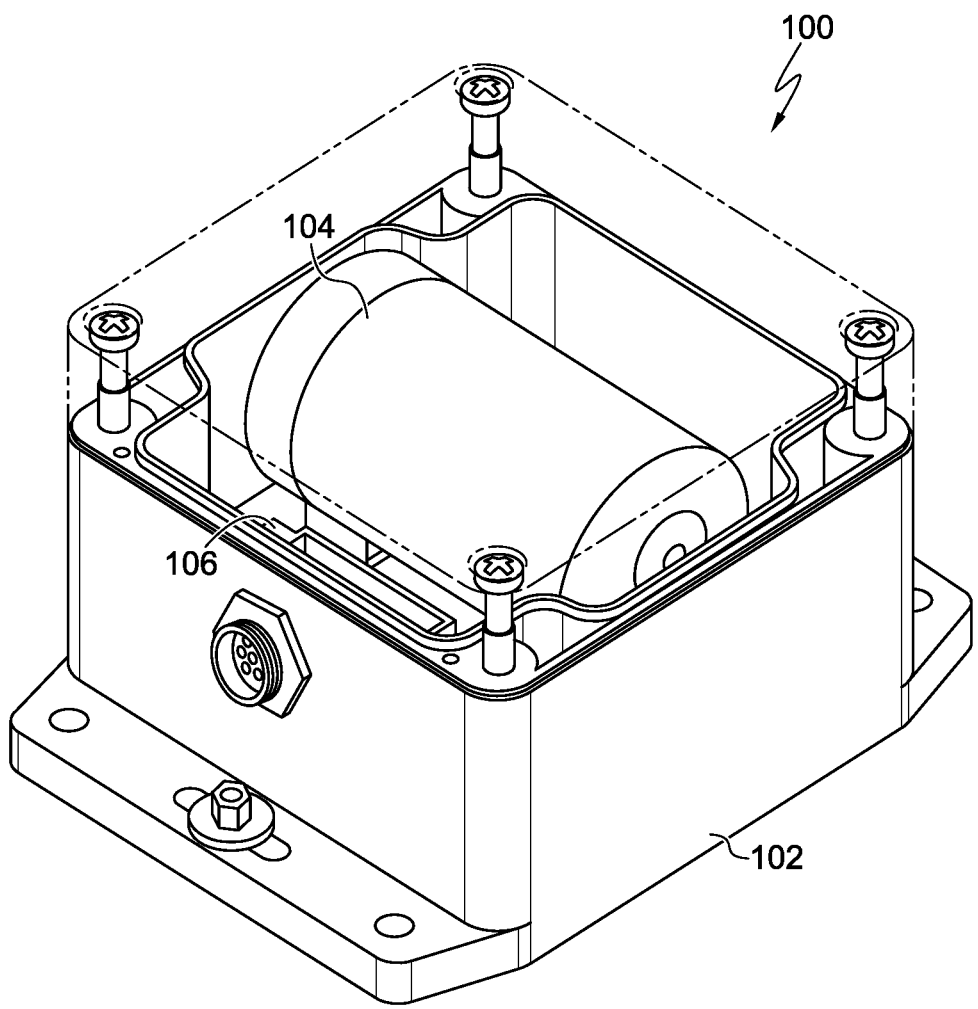
FIG. 1 is a side perspective view of an exemplary intrinsically-safe sensor system according to embodiments described herein.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION OF THE PREFERRED EMBODIMENTS

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

Definitions

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those skilled in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "acoustically coupled," when used in reference to the relationship between two or more entities, means that the two or more entities are connected in a manner that facilities the transmission of acoustic (or sound) waves between the two or more entities, or from at least one entity to at least one other entity.

The term "and/or" placed between a first entity and a second entity means one of: (1) the first entity; (2) the second entity; and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

The phrase "at least one," when used in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase "based on" does not mean "based only on," unless expressly specified otherwise. In other words, the phrase "based on" means "based only on," "based at least on," and/or "based at least in part on."

As used herein, the term "configured," when used in reference to a given element, component, or other subject matter, means that the element, component, or other subject matter is designed and/or intended to perform a given function. Thus, the use of the term "configured" should not be construed to mean that the element, component, or other subject matter is simply "capable of" performing a given function but that the element, component, and/or other subject matter is specifically selected, created, implemented, utilized, and/or designed for the purpose of performing the function.

As used herein, the terms "example," exemplary," and "embodiment," when used with reference to one or more components, features, structures, and/or methods according to the present techniques, are intended to convey that the described component(s), feature(s), structure(s), and/or method(s) are illustrative, non-exclusive examples of component(s), feature(s), structure(s), and/or method(s) according to the present techniques. Thus, the described component(s), feature(s), structure(s), and/or method(s) are not intended to be limiting, required, or exclusive/exhaustive; and other component(s), feature(s), structure(s), and/or method(s), including structurally and/or functionally similar and/or equivalent component(s), feature(s), structure(s), and/or method(s), are also within the scope of the present techniques.

Certain aspects and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by those skilled in the art.

Furthermore, concentrations, dimensions, amounts, and/or other numerical data that are presented in a range format are to be interpreted flexibly to include not only the numerical values explicitly recited as the limits of the range, but also all individual numerical values or sub-ranges encompassed within that range, as if each numerical value and sub-range were explicitly recited. For example, a disclosed numerical range of 1 to 200 should be interpreted to include, not only the explicitly-recited limits of 1 and 200, but also individual values, such as 2, 3, 4, 197, 198, 199, etc., as well as sub-ranges, such as 10 to 50, 20 to 100, etc.

Overview

As described herein, it can be particularly burdensome to utilize sensing devices to monitor conditions of interest within an operational area that has been classified as a hazardous zone. This is due to the fact that multiple different types of sensing devices may be needed to monitor all the conditions of interest, and each sensing device must be certified to be operational in the area, meaning that the device meets all the required safety standards. Furthermore, in some cases, it may be difficult to locate sensing devices that effectively monitor particular conditions while still meeting the required safety standards.

Embodiments described herein solve this problem by providing a single, Internet of Things (IoT) sensor system (alternatively referred to as a "smart" sensor system) that is capable of monitoring many different conditions through a suite of onboard and expandable sensors. In particular, the sensor system includes one or more acoustic sensors, where such acoustic sensor(s) include one or more microphones. In addition, the sensor system may include, for example, one or more pressure sensors, one or more temperature sensors, one or more fluid flow sensors, one or more motion sensors, one or more conductivity/resistivity sensors, and/or one or more capacitive sensors.

The entire sensor system is contained within an intrinsically-safe, water-resistant housing or enclosure. Moreover, the sensor system includes a connector that provide an intrinsically-safe means for expanding the sensor system by internally and/or externally connecting one or more additional sensors or other devices to the sensor system on demand, as described further herein. Furthermore, while microphones have traditionally been difficult to incorporate into hazardous zones due to the presence of open ports, embodiments described herein enable the microphone(s) to be successfully incorporated into the sensor system while still complying with the required safety standards, as described further herein.

Exemplary Components and Configuration of Intrinsically-Safe Sensor System

The following is a discussion of several exemplary components of the intrinsically-safe sensor system described herein. However, those skilled in the art will appreciate that the sensor system is not limited to the particular components provided herein but, rather, may include any number of additional or alternative components, depending on the details of the particular implementation. Furthermore those skilled in the art will appreciate that the sensor system is not limited to the configuration described herein but, rather, may include any number of alternative configurations that provide the same overall technical effect.

FIG. 1 is a side perspective view of an exemplary intrinsically-safe sensor system 100 according to embodiments described herein. As shown in FIG. 1, the sensor system 100 includes several internal components that are contained within a housing or enclosure 102 that serves as a safety barrier for the internal components. In various embodiments, the enclosure 102 is formed from water-resistant polycarbonate and stainless steel. However, those skilled in the art will appreciate that other types of enclosures may also be used to achieve the same technical effect.

In various embodiments, the sensor system 100 includes an independent power source. For example, according to the embodiment shown in FIG. 1, the sensor system 100 is powered by a battery 104, which may be, for example, a replaceable D-Cell 19 amp-hour lithium metal battery. In other embodiments, the sensor system 100 may be powered by a fuel cell. Moreover, in other embodiments, the sensor system 100 may include a self-generating power source formed from a coil and magnet. This may be particularly useful for embodiments in which the sensor system 100 generates vibration energy as a result of its attachment to vibrating equipment.

Figure 4A:
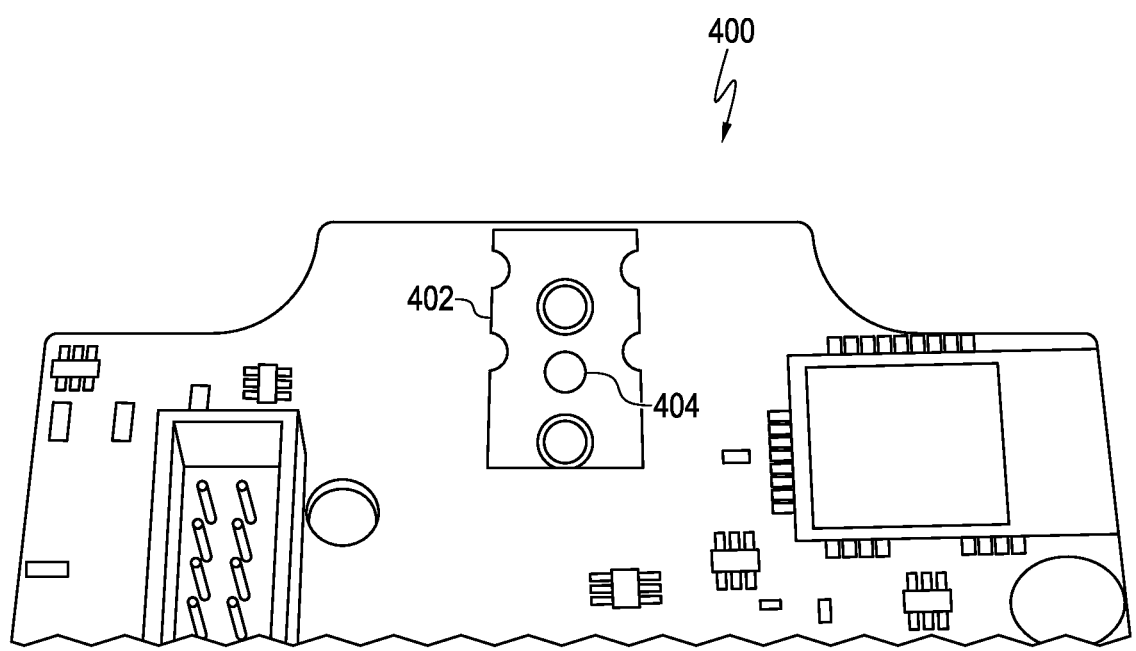
FIG. 4A is a schematic view of a partially-assembled portion of an exemplary circuit board for am intrinsically-safe sensor system according to embodiments described herein, where the partially-assembled portion of the circuit board includes a battery shim for positioning and aligning the battery terminals.
Figure 4B:
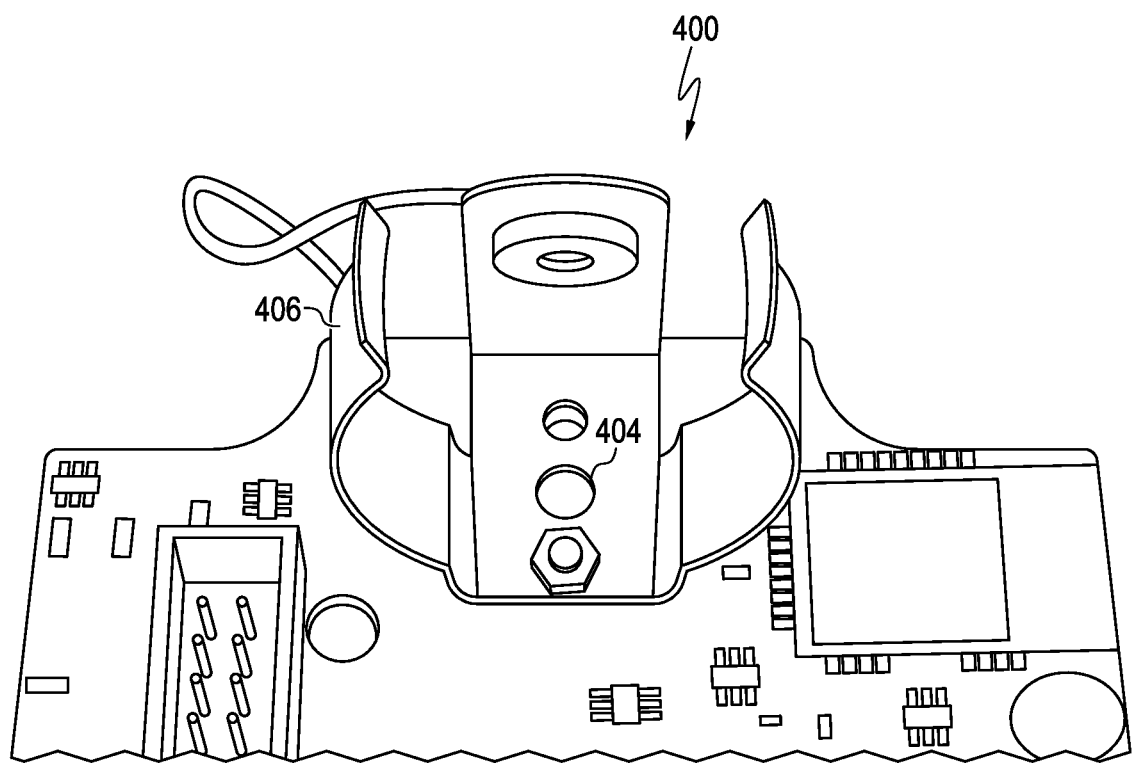
FIG. 4B is a schematic view of another partially-assembled portion of the exemplary circuit board of FIG. 4A, where the partially-assembled portion of the circuit board includes a battery clip installed over the battery shim.

For some embodiments in which one or more batteries, such as the battery 104 in FIG. 1, are used as the power source, the sensor system 100 also includes a novel battery shim (not shown) for positioning the battery terminals during manual assembly, as described further with respect to FIGS. 4A and 4B. However, in other embodiments in which one or more batteries are used as the power source, the sensor system 100 may be manufactured using an injection molding process and, thus, the battery shim may not be included.

The sensor system 100 also includes a circuit board 106 for mechanically supporting and electrically connecting the electronic components (not shown) of the sensor system 100. Such electronic components may include, but are not limited to, one or more processors, one or more memory components, one or more communication connections, the power source (e.g. the battery 104), any of multiple different types of sensors (as described further herein), one or more analog-to-digital converters (ADCs), and the connector described herein. Moreover, the electronic components are connected via a system bus. The system bus can be implemented using any suitable type of bus architecture and can be configured to support multiple different types of communication protocols. For example, in various embodiments, the system bus is configured to support some combination of the Inter-Integrated Circuit ($I^2C$) communication protocol, the Serial Peripheral Interface (SPI) communication protocol, and the Universal Asynchronous Receiver/Transmitter (UART) communication protocol.

The processor(s) may include, for example, a central processing unit (CPU), a microprocessor, a system on chip (SOC), a digital signal processor (DSP), an application specific integrated circuit (ASIC), and/or a field programmable gate array (FPGA). In various embodiments, the processor(s) within the sensor system 100 are configured with digital signal processing capabilities to enable various signal processing functions to be carried out locally on the sensor system 100.

The memory component(s) may include, for example, non-volatile flash memory, such as NAND flash memory and/or NOR flash memory. Additionally or alternatively, the memory component(s) may include random access memory (RAM) (such as static RAM (SRAM), dynamic RAM (DRAM), synchronous DRAM (SDRAM), or the like) and/or read-only memory (ROM) (such as programmable ROM (PROM), erasable PROM (EPROM), electronically erasable PROM (EEPROM), or the like).

The communication connection(s) may include any suitable hardware and/or software for communicably coupling the sensor system 100 to one or more remote computing systems (such as, for example, one or more remote control units that are used to direct the operation of the sensor system 100) using any of various different types of wireless and/or wired communications techniques, such as, for example, the Bluetooth networking protocol, the Wi-Fi networking protocol, the Zigbee mesh networking protocol, and/or the Thread mesh networking protocol. For example, the communication connection(s) may include a network interface card (NIC) for communicably coupling the sensor system 100 to one or more remote computing systems through a network. As will be appreciated by those skilled in the art, the sensor data recorded by the sensor system 100 may be stored in the onboard memory component(s) of the sensor system 100 and processed locally using the processor(s) of the sensor system. Additionally or alternatively, raw and/or processed sensor data may be sent to the remote computing system(s) using the NIC and/or other communication connection(s). Moreover, the sensor system 100 may also include updatable firmware and configuration parameters that can be updated locally over Bluetooth and/or remotely over Wi-Fi, for example, using one or more remote computing systems that are communicably coupled to the sensor system 100. Accordingly, in various embodiments, the sensor system 100 described herein functions as an Internet of Things (IoT) device that is connected to the network and is configured to send and receive data, as well as to receive control commands, over the network.

According to embodiments described herein, the sensor system 100 includes a suite of onboard and expandable sensors. In particular, the sensor system 100 includes one or more acoustic sensors for recording acoustic data within the range of, for example, around 200 hertz (Hz) to around 100 kilohertz (kHz). Such acoustic sensor(s) include one or more microphones, which are sensitive to vibrations through air, and may also include one or more accelerometers, which are sensitive to vibrations through solid and/or liquid media. For example, in various embodiments, two or more microphones (such as, for example, two or more piezoelectric MEMS microphones, each with an acoustic sampling rate of up to 100 kHz) are included within the sensor system 100 to provide higher processing rates (e.g., higher sampling and/or bit rates) as compared to sensor devices including only one microphone. In addition, in various embodiments, the microphones are positioned such that the directionality of the recorded sound waves can be determined. For example, for embodiments in which the sensor system 100 is installed on a pipe, the microphones may be positioned parallel to the pipe to enable the directionality of sound waves traveling through the pipe to be determined.

In various embodiments, the sensor system 100 also includes any number of other sensors, such as, for example, one or more pressure sensors, one or more temperature sensors, one or more fluid flow sensors, one or more motion sensors, one or more conductivity/resistivity sensors, and/or one or more capacitive sensors. Examples of suitable motion sensors include one or more gyroscopes, one or more accelerometers, and/or one or more magnetometers, for example, that provide motion information relating to the orientation, acceleration/vibration, and/or magnetic field, respectively, in the vicinity of the sensor system 100.

Furthermore, in various embodiments, any number of sensors and/or other electronic components within the sensor system 100 may be combined into a single unit. For example, in some embodiments, the sensor system 100 includes an inertial measurement unit (IMU). The IMU may include multiple gyroscopes, accelerometers, and magnetometers that are configured to measure the orientation, acceleration/vibration, and magnetic field, respectively, acting on the sensor system (and the equipment on which it is installed).

In various embodiments, the analog-to-digital converter(s) (ADCs) of the sensor system 100 are used to convert analog signals recorded by analog sensor devices, such as, for example, the microphone(s), to digital signals that can be processed by the processor. In some embodiments, the analog-to-digital converter(s) include one or more 12-bit ADCs. However, those skilled in the art will appreciate that one or more ADCs with different resolutions, such as, for example, 10-bit and/or 16-bit ADCs, may additionally or alternatively be utilized.

According to embodiments described herein, the sensor system 100 includes a connector that provides an intrinsically-safe means for expanding the sensor system 100 by internally and/or externally connecting one or more additional sensors and/or other analog input/output devices to the sensor system 100. Specifically, in various embodiments, the connector includes an internal connection region for internally connecting one or more additional sensors and/or other analog input/output devices to the sensor system 100, as well as an external connection region for externally connecting one or more additional sensors and/or other analog input/output devices to the sensor system 100. In various embodiments, the connector is fully configurable and is capable of communicating with the additional sensor(s)/device(s) via multiple different communication protocols, such as, for example, the I²C communication protocol, the SPI communication protocol, and/or the UART communication protocol. As an example, in some embodiments, the internal connection region of the connector may be used to connect an additional microphone to the sensor system 100 during the assembly process to increase the system's processing rates (e.g., sampling and/or bit rates) for recording/processing sound data. As another example, the external connection region of the connector may be used to connect an additional microphone to the sensor system 100 on demand after the assembly process is complete and/or to connect the sensor system to a communication device that facilitates communication with one or more remote computing systems, such as one or more remote control units. As will be appreciated by those skilled in the art, the inclusion of the connector within the sensor system 100 provides a wide degree of flexibility for logically connecting various different types of electronic components (or devices) to the circuit board 106 in a manner that enables the connected components to function the same as the other electronic components within the sensor system 100.

According to embodiments described herein, the sensor system 100 is configured to be "intrinsically safe," meaning that the sensor system 100 meets the required safety standards to be certified for use in operational areas that are classified as hazardous zones. In various embodiments, this intrinsic safety is provided, in part, by the water-resistant enclosure 102. In addition, during assembly, the circuit board 106 and corresponding electronic components are encapsulated using a potting compound or material, such as epoxy (not shown). This encapsulation increases the intrinsic safety of the sensor system 100 by providing for the effective dissipation of energy, thus preventing the electronic components from becoming overheated. Moreover, it should be noted that it is generally desirable to test the sensor system 100 to ensure the operability of all the electronic components prior to encapsulating the circuit board 106 and the corresponding electronic components using the potting material, since the circuit board 106 and the electronic components will, practically-speaking, take the form of a solid brick once the potting material has hardened. Furthermore, in various embodiments, the sensor system 100 also includes a novel and intrinsically-safe configuration for installing the microphone(s), as described further with respect to FIGS. 5, 6A, 6B, and 6C.

Figure 2:
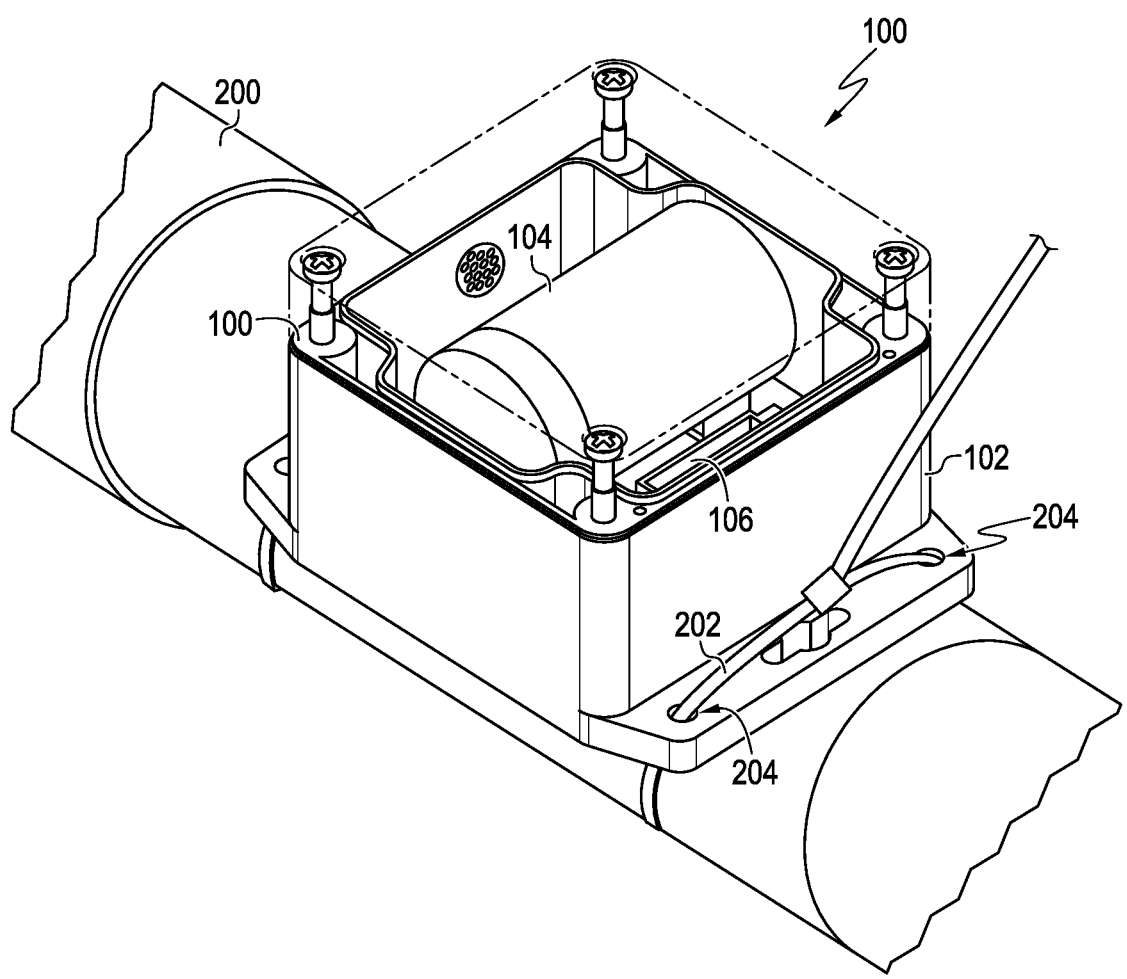
FIG. 2 is a side perspective view of an exemplary installation of the intrinsically-safe sensor system of FIG. 1 on a pipe according to embodiments described herein.

FIG. 2 is a side perspective view of an exemplary installation of the intrinsically-safe sensor system 100 of FIG. 1 on a pipe 200 according to embodiments described herein. Like numbered items are as described with respect to FIG. 1. According to the embodiment shown in FIG. 2, the sensor system 100 is installed on the pipe 200 using straps 202 (such as heavy-duty zip ties) that are run through holes 204 within the enclosure 102 and then around the pipe 200. However, those skilled in the art will appreciate that the sensor system 100 can be installed on the pipe 200 (or other equipment or structure) in any other suitable manner, depending on the details of the particular implementation. As an example, the sensor system 100 may be installed on the pipe 200 using clamps, magnets, bolts, or the like. As another example, the sensor system 100 may be welded or chemically bonded to the pipe 200, although the use of straps, clamps, or other types of fasteners is generally preferred, since their use allows the sensor system 100 to be selectively attached to, and detached from, the pipe 200.

In various embodiments, the sensor system 100 is installed such that it is positioned relatively close to the location of the events and/or conditions of interest within the pipe 200. For example, according to the embodiment shown in FIG. 2, the sensor system 100 is mounted to the outer wall of the pipe 200 in a manner that enables the acoustic sensors within the sensor system 100 to detect acoustic waves propagating within the pipe 200.

Figure 3:
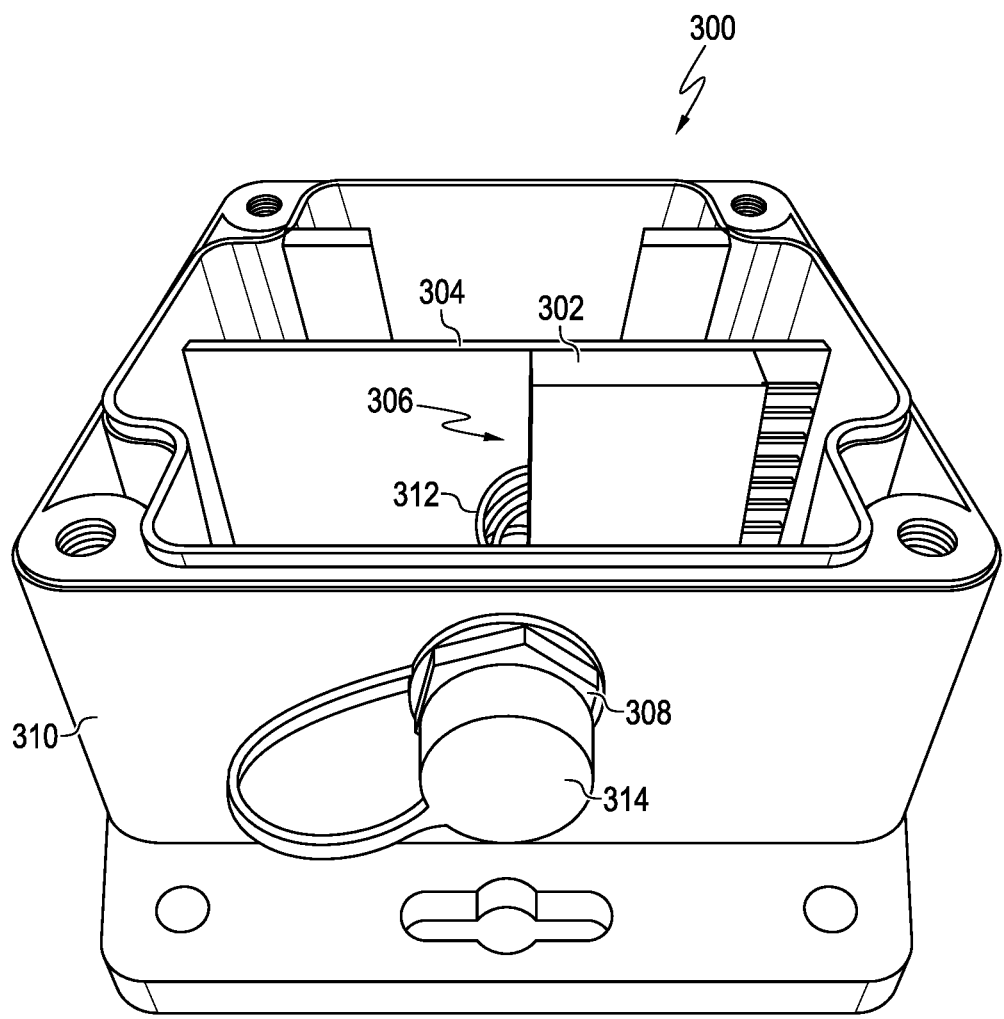
FIG. 3 is a side perspective view of an exemplary, partially-assembled intrinsically-safe sensor system including a connector that enables expansion of the sensor system according to embodiments described herein.

FIG. 3 is a side perspective view of an exemplary, partially-assembled intrinsically-safe sensor system 300 including a connector 302 that enables expansion of the sensor system 300 according to embodiments described herein. According to the embodiment shown in FIG. 3, the connector 302 is installed on an interposing circuit board 304 that is perpendicular to the main circuit board (not shown) of the sensor system 300. In various embodiments, the connector 302 includes an internal connection region 306 that enables the sensor system 300 to be expanded by internally connecting one or more additional sensors and/or other analog devices to the sensor system 300. As an example, the internal connection region 306 may be used to connect an additional microphone to the sensor system 300 during the assembly process to increase the system's processing rates (e.g., sampling and/or bit rates) for recording/processing sound data.

Furthermore, in various embodiments, the connector 302 includes an external connection region 308 that enables the sensor system 300 to be expanded by externally connecting one or more additional sensors and/or other analog devices to the sensor system 300. As shown in the FIG. 3, the external connection region 308 may be installed on a wall 310 of the system enclosure (e.g., the enclosure described herein) to enable one or more external devices, such as one or more additional sensors and/or other analog devices, to be plugged into (or communicably coupled to) the sensor system 300 via a number of wires 312 running from the external connection region 308 to the pins of the connector 302. As an example, in some embodiments, the external connection region 308 of the connector 302 can be used to connect a high-resolution ADC to the sensor system 300 to increase the overall ADC resolution of the system from, for example, 12 bits to, for example, 24 bits to 28 bits. This may result in a significant increase in the processing rate for the overall sensor system 300.

Figure 7:
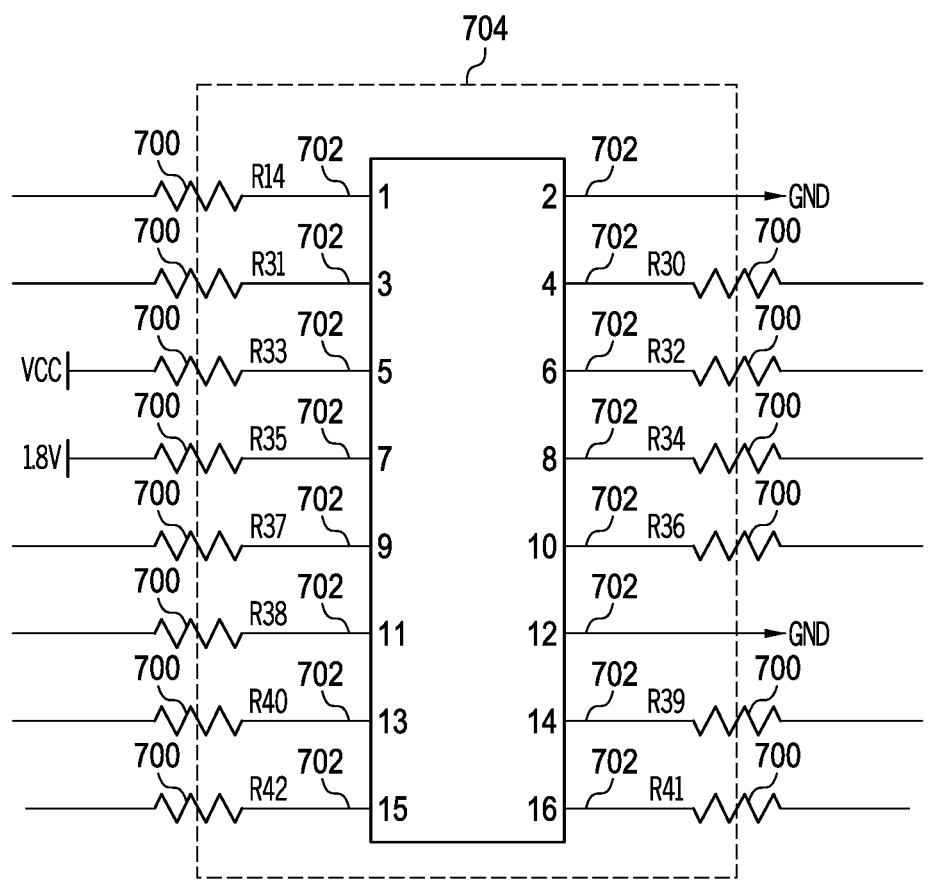
FIG. 7 is a simplified circuit diagram showing the manner in which resistors may be attached to pins of the connector to increase the intrinsic safety of the sensor system described herein.

In various embodiments, the connector 302 is intrinsically safe due to the partial encapsulation of the connector 302 within potting material (e.g., epoxy) along with the other internal components of the sensor system 300, as well as due to the electrical coupling of current-limiting resistors to the pins of the connector 302 to account for the connector's partial exposure to the external environment via the external connection region 308, as described further with respect to FIG. 7. Furthermore, in various embodiments, the intrinsic safety of the connector 302 is further increased by including a rubber cap 314 that can be placed over the external connection region 308 when it is not in use.

Moreover, in various embodiments, the connector 302 is fully configurable and is capable of communicating with a wide variety of different sensor(s)/device(s) via multiple different communication protocols, such as, for example, the I²C communication protocol, the SPI communication protocol, and/or the UART communication protocol. Accordingly, the inclusion of the connector 302 within the sensor system 300 provides increased flexibility for the overall configuration of the sensor system 300.

FIG. 4A is a schematic view of a partially-assembled portion of an exemplary circuit board 400 for an intrinsically-safe sensor system according to embodiments described herein, where the partially-assembled portion of the circuit board 400 includes a battery shim 402 for positioning and aligning the battery terminals. As shown in FIG. 4A, the battery shim 402 includes a positioning mark 404 that shows the proper positioning and spacing for securing a battery clip (or battery holder) to the circuit board 400 via one or more screws, rivets, or the like during assembly of the sensor system.

FIG. 4B is a schematic view of another partially-assembled portion of the exemplary circuit board 400 of FIG. 4A, where the partially-assembled portion of the circuit board 400 includes the battery clip (or battery holder) 406 installed over the battery shim 402. As shown in FIG. 4B, the positioning mark 404 is still visible after installation of the battery clip 406, providing visual confirmation that the battery clip 406 has been installed in the proper location. For embodiments in which the circuit board 400 for the sensor system is manually assembled, this novel battery shim 402 with the corresponding positioning mark 404 may significantly reduce the time and cost of assembly. For example, in some embodiments, the circuit board 400 may be assembled around 90-95% faster using the novel battery shim 402.

Exemplary Microphone Installation within Intrinsically-Safe Sensor System

Most microphones are designed to capture sound waves traveling through the air and to convert such sound waves into electrical signals on which further processing can be done. To detect the sound waves, the microphone must be exposed to the air the sound is traveling through. For conventional microphones designed to be placed on circuit boards, a port of the microphone is positioned such that it is aligned with a through hole in the circuit board and a corresponding opening in the enclosure itself. The through hole and the corresponding opening then allow air to travel through and, thus, access the port for proper sound transduction. Moreover, the through hole and the corresponding opening typically must be protected from large blockages for the microphone to function properly.

Conversely, sensing devices that are designed to be used in operational zones that are classified as hazardous zones must be configured to prevent explosive conditions from arising as a result of external hazards surrounding such devices. Therefore, enclosures for such devices generally do not have any openings or holes that connect the internal components (such as the circuit board, which is a potential source of sparks/arcs) with the external environment. Moreover, the internal components of such sensing devices are often encapsulated or potted inside the enclosures to further reduce the explosion potential. As the encapsulation/potting material generally starts as a liquid epoxy, it is difficult to keep the liquid epoxy from entering the through hole of the circuit board and, thus, blocking the port of the microphone.

Figure 5:
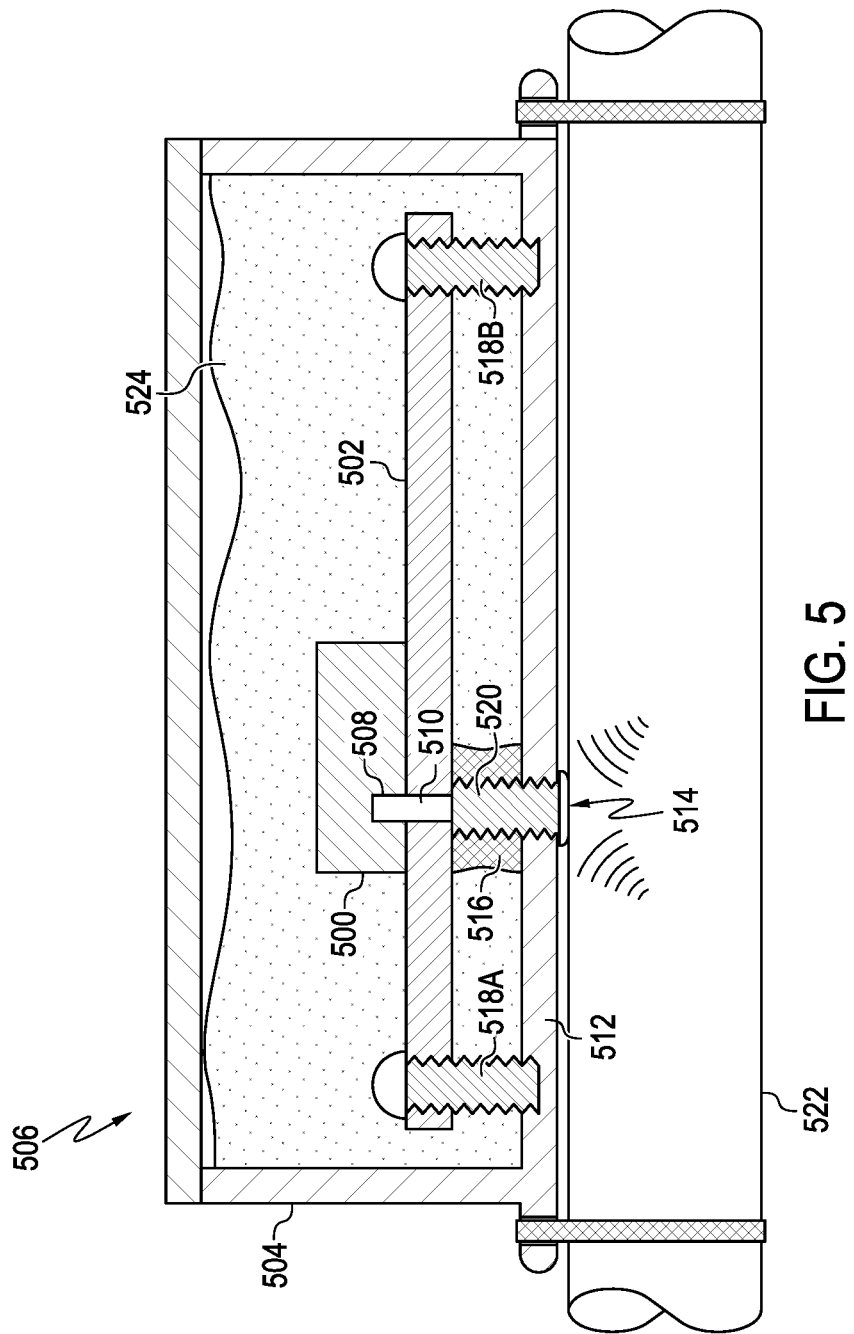
FIG. 5 is a cross-sectional schematic view of a microphone installed on a circuit board within an enclosure of an intrinsically-safe sensor system according to embodiments described herein.

Embodiments herein solve this problem by providing for the installation of one or more microphones within the intrinsically-safe sensor system described herein. Specifically, FIG. 5 is a cross-sectional schematic view of a microphone 500 installed on a circuit board 502 within an enclosure 504 of an intrinsically-safe sensor system 506 according to embodiments described herein. As shown in FIG. 5, a port 508 of the microphone 500 is positioned such that it is aligned with a through hole 510 in the circuit board 502. This through hole 510 acts as an air gap that allows air to access the port 508 for proper sound transduction. The circuit board 502 is installed within the enclosure 504 with the port-side of the microphone 500 facing a wall 512 of the enclosure 504. This wall 512 has an opening 514 to the external environment. To seal off this opening 514 but still maintain the air gap near the port 508 of the microphone 500, an elastomer tubing 516 (such as, for example, a silicone tubing) is placed between the wall 512 of the enclosure 504 and the bottom side of the circuit board 502 such that the elastomer tubing 516 covers both the opening 514 in the enclosure wall 512 and the through hole 510 in the circuit board 502 and, thus, connects the opening 514 with the though hole 510. The circuit board 502 is then secured to the wall 512 of the enclosure 504 in any suitable manner (e.g., using the bolts 518A and 518B shown in FIG. 5), which results in the compression of the elastomer tubing 516 that is positioned between the circuit board 502 and the wall 512 of the enclosure 504. This compression of the elastomer tubing 516 effectively seals off the internal environment within the sensor system 506 from the external environment outside the sensor system 506. In addition, the compression of the elastomer tubing 516 prevents potting material (e.g., liquid epoxy) or any other substance from entering the through hole 510 on the circuit board 502, thus ensuring that the operability of the microphone 500 is not compromised by blockages in or around the microphone port 508.

A metal fastener 520 (e.g., a metal screw or bolt) is then inserted through the opening 514 in the enclosure wall 512 such that the metal fastener 520 extends through the elastomer tubing 516 and up to the bottom of the circuit board 502 within proximity to the through hole 510 in the circuit board 502 (e.g., within about 0.03125 inches of the through hole 510). Then, when the outer end of the metal fastener 520 (e.g., the end that is in contact with the external environment) comes into contact with a source of vibration 522 (e.g., a pipe according to the embodiment shown in FIG. 5), the metal fastener 520 transmits the acoustic (or sound) energy from the external environment to the air gap within the through hole 510 near the port 508 of the microphone 500, enabling the microphone 500 to effectively record the corresponding acoustic (or sound) waves.

In addition, in various embodiments, the metal fastener 520 enables ambient sounds within the external environment to be dampened. This may be used to prevent the microphone 500 from transitioning from a low-power state to a full-power state in response to ambient sounds that do not relate to conditions and/or events of interest corresponding to the source of vibration 522. For example, in various embodiments, the sensor system 506 may be manually or automatically configured with threshold signal levels for transitioning from the low-power state to the full-power state, where such threshold signal levels may be generalized or may be specific to each type of sensor within the sensor system 506. Therefore, the novel and intrinsically-safe installation of the microphone 500 within the sensor system 506 according to embodiments described herein may reduce the overall power consumption of the sensor system 506 by dampening ambient sounds that would typically cause conventional sensor systems to transition from the low-power state to the full-power state.

Moreover, as shown in FIG. 5, once the microphone 500 and all the other electronic components of the sensor system 506 have been installed (and tested to ensure the operability of all the electronic components), the components may be encapsulated in potting material 524 to further increase the intrinsic safety of the sensor system 506, as described herein. Furthermore, it should be noted that, while only one microphone 500 is depicted in the cross-sectional schematic view of FIG. 5, in various embodiments, the sensor system 506 includes two or more microphones (such as, for example, two or more piezoelectric MEMS microphones, each with an acoustic sampling rate of up to 100 kHz) to provide higher processing rates (e.g., higher sampling and/or bit rates) and to enable the determination of the directionality of the recorded acoustic waves.

Figure 6A:
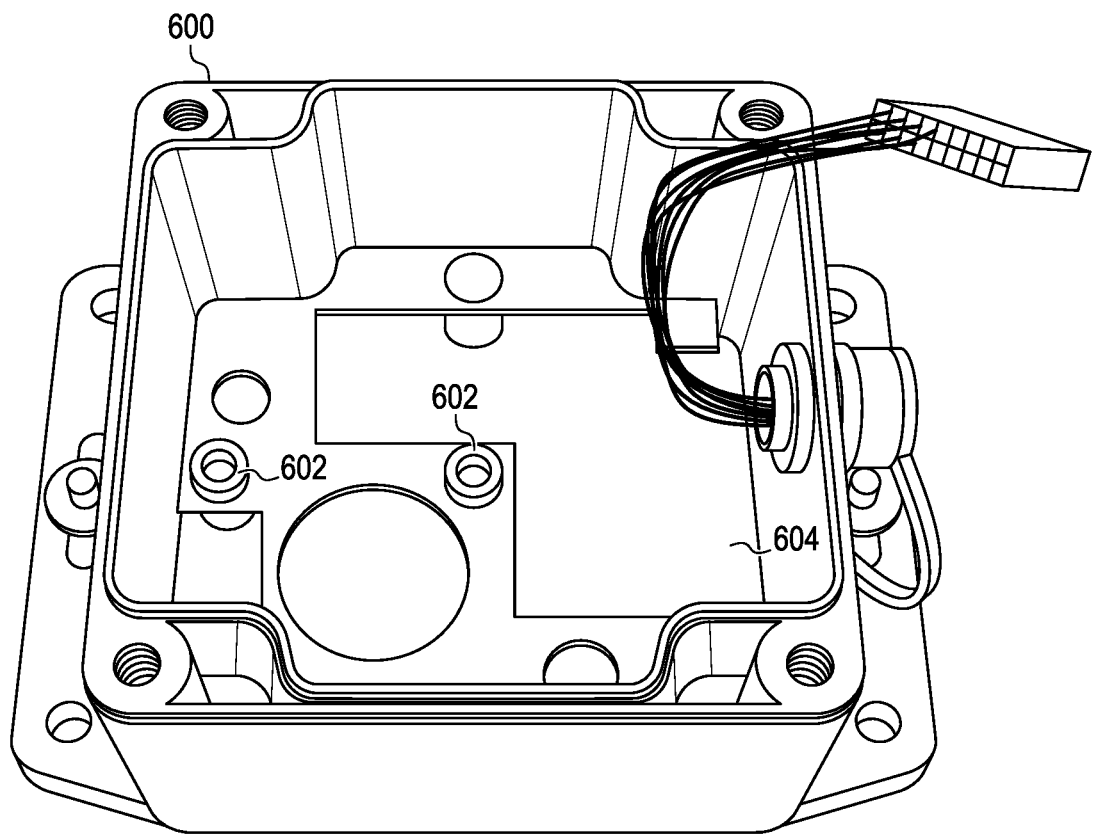
FIG. 6A is a top perspective view of an enclosure including elastomer tubing installed over two openings within a wall of the enclosure.
Figure 6B:
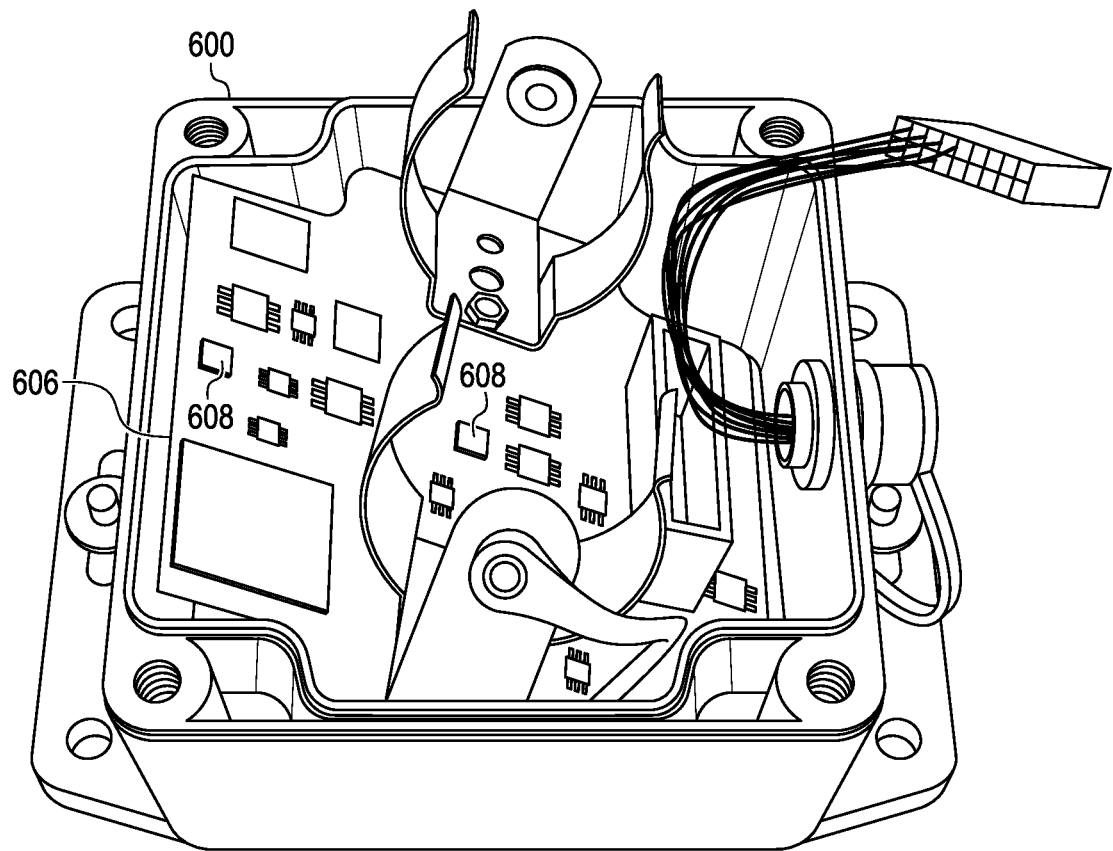
FIG. 6B is a top perspective view of the enclosure of FIG. 6A showing a circuit board including two microphones installed within the enclosure such that the elastomer tubing is compressed between the wall of the enclosure and corresponding through holes on the circuit board, which are covered by the microphones and aligned with the microphone ports.
Figure 6C:
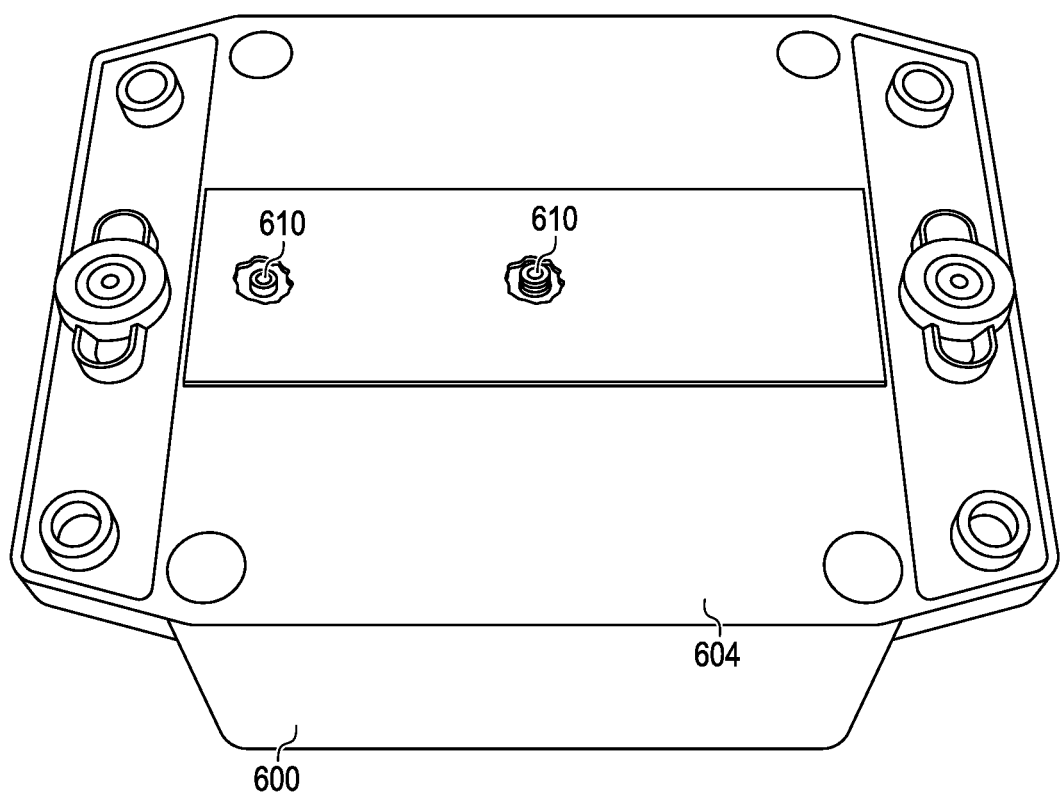
FIG. 6C is a bottom perspective view of the enclosure of FIGS. 6A and 6B showing metal fasteners that are drilled through the openings within the wall of the enclosure to complete the installation of the microphones within the enclosure.

FIG. 6A is a top perspective view of an enclosure 600 including elastomer tubing 602 installed over two openings (not shown) within a wall 604 of the enclosure 600. FIG. 6B is a top perspective view of the enclosure 600 of FIG. 6A showing a circuit board 606 including two microphones 608 installed within the enclosure 600 such that the elastomer tubing 602 is compressed between the wall 604 of the enclosure 600 and corresponding through holes (not shown) on the circuit board 606, which are covered by the microphones 608 and aligned with the microphone ports (not shown). FIG. 6C is a bottom perspective view of the enclosure 600 of FIGS. 6A and 6B showing metal fasteners 610 that are drilled through the openings within the wall 604 of the enclosure 600 to complete the installation of the microphones 608 within the enclosure 600.

FIG. 7 is a simplified circuit diagram showing the manner in which resistors 700 may be attached to pins 702 of the connector 704 to increase the intrinsic safety of the sensor system described herein. Specifically, according to the embodiment shown in FIG. 7, the connector 704 is a 16-pin connector, and the resistors 700 are 100-ohm resistors that are electrically coupled to pin numbers 1, 3, 4, 5, 6, 7, 8, 9, 10, 11, 13, 14, 15, and 16, which constitute all the pins except the two ground pins (i.e., pin numbers 2 and 12). In various embodiments, such resistors 700 increase the intrinsic safety of the sensor system by limiting the current flowing through the connector 704. This is particularly useful since the external connection region of the connector 704 is partially exposed to the external environment rather than being entirely encapsulated within the heat-dissipating potting material. Therefore, the resistors 700 are used to protect the connector 704 from overheating (e.g., as a result of a component malfunction) and potentially igniting hazardous fumes or explosive gases to which the external connection region of the connector 704 is exposed. Furthermore, as described herein, the exposure of the external connection region of the connector 704 to the external environment may be further mitigated by securing the rubber cap on top of the external connection region when it is not in use.

Figure 8:
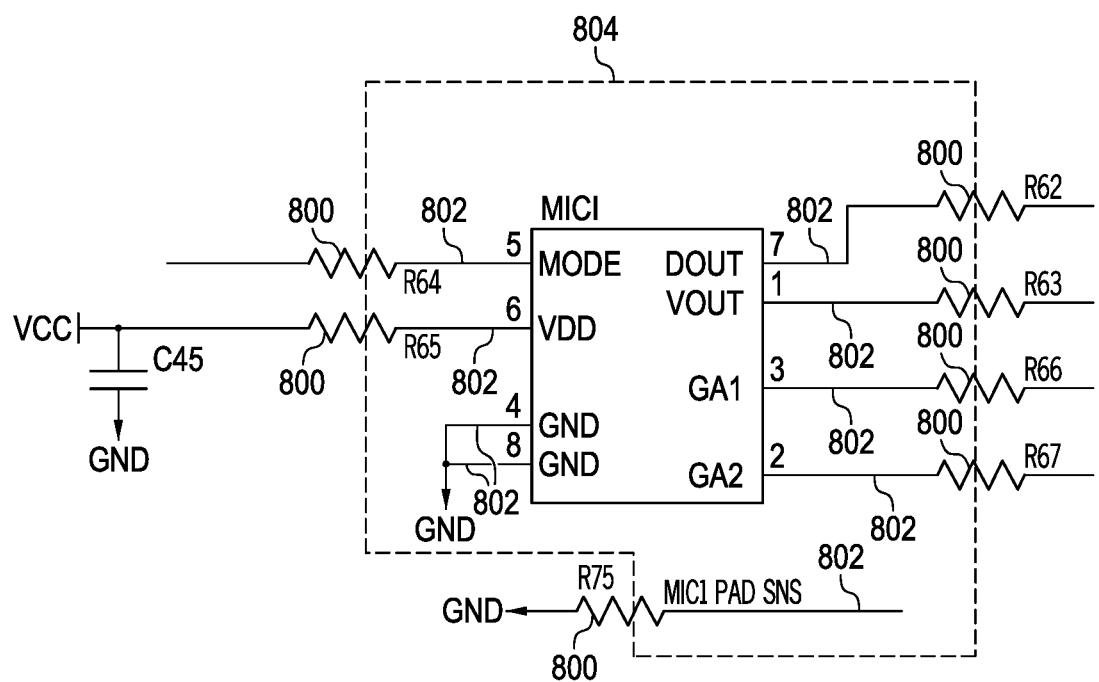
FIG. 8 is a simplified circuit diagram showing the manner in which resistors may be attached to pins of the microphone to increase the intrinsic safety of the sensor system described herein.

FIG. 8 is a simplified circuit diagram showing the manner in which resistors 800 may be attached to pins 802 of the microphone 804 to increase the intrinsic safety of the sensor system described herein. Such resistors 800 serve the same purpose as the resistors 700 described with respect to FIG. 7. In particular, because the port of the microphone 804 is partially exposed to the external environment rather than being entirely encapsulated within the heat-dissipating potting material, the resistors 800 are used to limit the current flowing through the microphone 804, thus protecting the microphone 804 from overheating (e.g., as a result of a component malfunction) and potentially igniting hazardous fumes or explosive gases to which the port of the microphone 804 is exposed.

Figure 9:
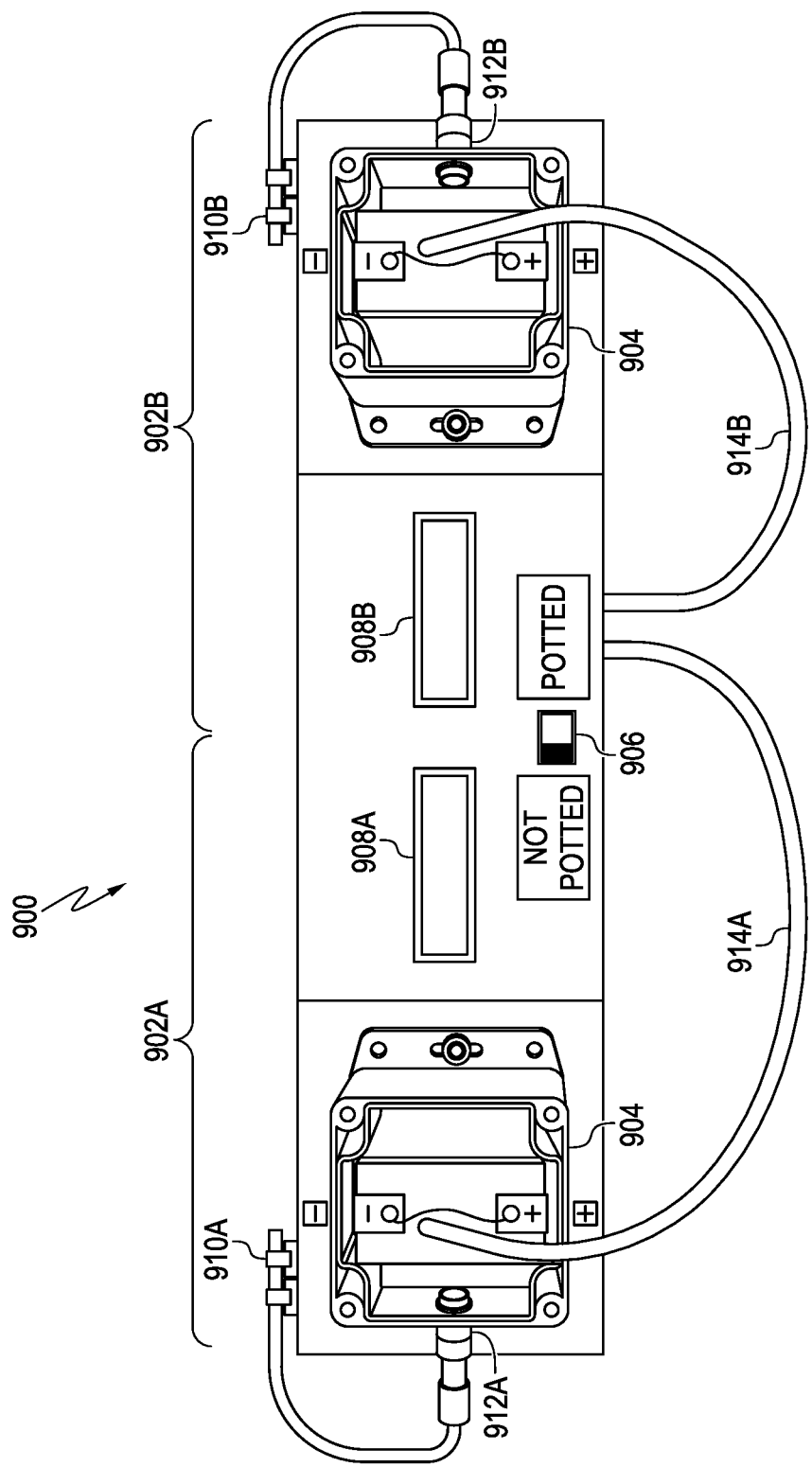
FIG. 9 is a schematic view of a test fixture that may be used to test whether the intrinsically-safe sensor system described herein is functioning properly.

FIG. 9 is a schematic view of a test fixture 900 that may be used to test whether the intrinsically-safe sensor system described herein is functioning properly. In various embodiments, the test fixture 900 may be used to test the functioning of the sensor system both before and after the encapsulation of the system components using the potting material (e.g., epoxy). However, testing the functioning of the sensor system prior to encapsulation is of particular importance since the internal components generally cannot be modified or fixed once they have been encapsulated within the potting material.

According to the embodiment shown in FIG. 9, the test fixture 900 includes two stations 902A and 902B, and each station 902A and 902B is configured to test a single sensor system 904. To prepare for this test, a switch 906 of the test fixture 900 is set to "Potted" mode or "Not Potted" mode, depending on whether the sensor systems being tested have already been encapsulated in potting material. For example, because the sensor systems 904 shown in FIG. 9 are clearly not potted, the switch 906 is set to the "Not Potted" mode. In addition, to prepare for the test, the test fixture 900 is powered on. When a display screen 908A of the first station 902A displays "Station 1 Ready" and a display screen 908B of the second station 902B displays "Station 2 Ready", the test fixture 900 is ready for use.

In various embodiments, the test fixture 900 includes one or more Hall Effect sensors (not shown) that are configured to detect magnets (not shown) installed on the enclosures of the sensor systems 904. Accordingly, when the sensor systems 904 are placed on each station 902A and 902B, the test fixture 900 will automatically detect their presence. Station connectors 910A and 910B may then be connected to the external connection regions 912A and 912B of the sensor system's connectors, as shown in FIG. 9. In addition, power may be supplied to the sensor systems 904 using each station's corresponding power cable 914A and 914B.

Once all the proper connections have been established, the test fixture 900 will automatically run through around 40 different function tests. Such function tests may include, for example, tests for EEPROM failure, flash failure, magnetometer failure, gyroscope failure, accelerometer failure, microphone audio signal failure, sound gain failure, SRAM failure, BLE failure, microphone wake sensitivity adjustment failure, microphone wake interrupt failure, temperature reading failure, connector continuity failure, battery voltage reading failure, and/or unexpectedly-high electrical current reading failure. Moreover, each function test may be associated with a particular error code, and the display screen 908A and 908B of each station 902A and 902B may display error codes corresponding to any failures that are detected during the test. Furthermore, when one or more failures are detected by the test fixture, it may be desirable to run the test at least one additional time to verify that the reading was accurate. If the same failures continue to be detected, the corresponding sensor system 904 can then be advantageously repaired before the system components are encapsulated in the potting material.

Figure 10:
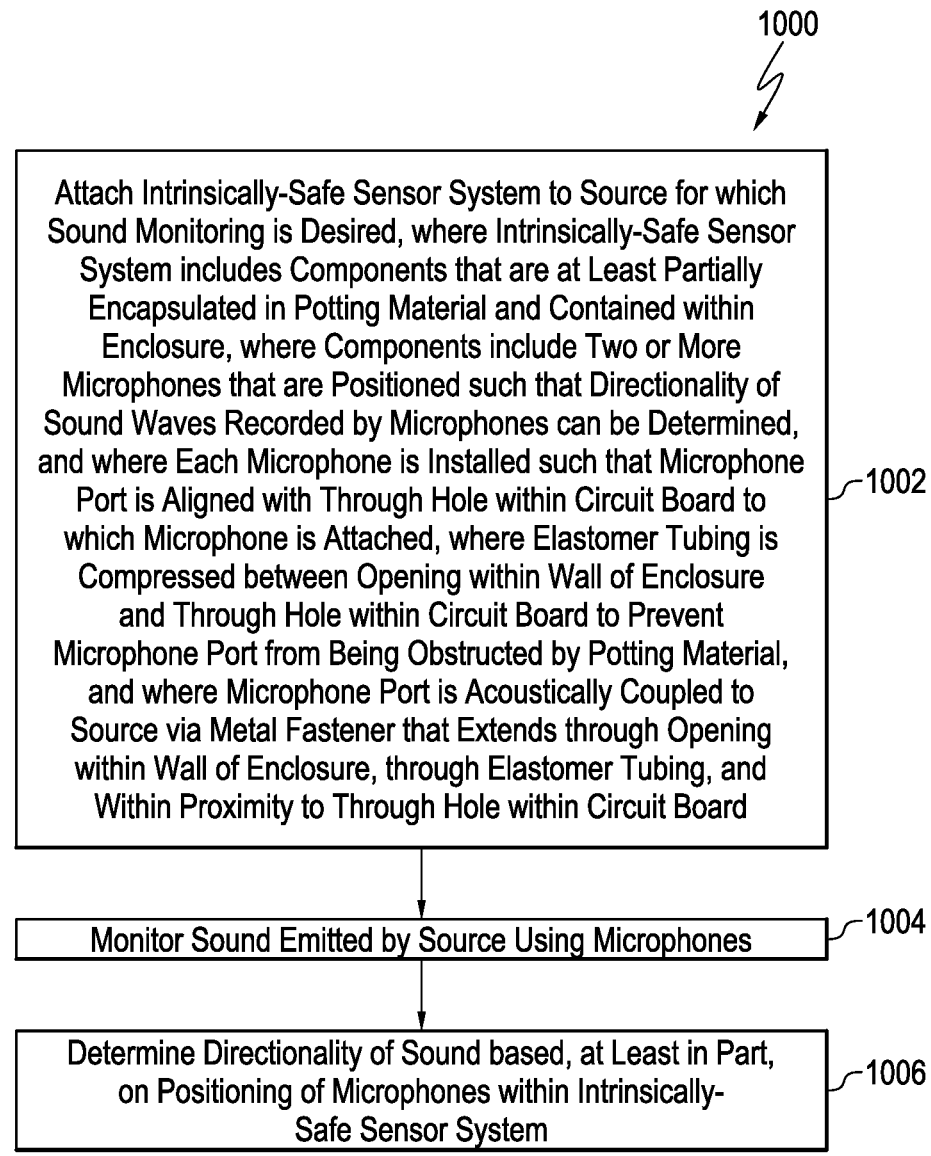
FIG. 10 is a process flow diagram of a method for monitoring sound corresponding to a source using the intrinsically-safe sensor system described herein.

Exemplary Method for Monitoring Conditions of Interest within Hazardous Zone Using Intrinsically-Safe Sensor System FIG. 10 is a process flow diagram of a method 1000 for monitoring sound corresponding to a source using the intrinsically-safe sensor system described herein. The method is implemented by the intrinsically-safe sensor system, which includes multiple sensors, one or more processors for processing sensor data obtained from the sensors, one or more memory components for storing the sensor data obtained from the sensors, a power source, one or more communication connections (e.g., a network interface card (NIC)) for communicably coupling the intrinsically-safe sensor system to one or more remote computing systems, a connector including an internal connection region for internally connecting an additional device to the intrinsically-safe sensor system and an external connection region for externally connecting another additional device to the intrinsically-safe sensor system on demand, as well as any number of other suitable components. In various embodiments, the connector is fully configurable and supports a number of communication protocols for connecting the additional devices to the intrinsically-safe sensor system. In various embodiments, the power source includes a battery that is installed within the intrinsically-safe sensor system using a battery shim on a circuit board of the intrinsically-safe sensor system, where the battery shim includes a positioning mark for positioning and aligning the battery holder on the circuit board.

In various embodiments, the intrinsically-safe sensor system also includes a system bus that supports a number of communication protocols (e.g., the I$^2$C communication protocol, the SPI communication protocol, and/or the UART communication protocol). Moreover, in various embodiments, the intrinsically-safe sensor system includes updatable firmware and configuration parameters, and the intrinsically-safe sensor system updates the updatable firmware and configuration parameters in response to input received from the remote computing system(s) via the communication connection(s). Furthermore, according to embodiments described herein, all the internal components of the intrinsically-safe sensor system are encapsulated in potting material (e.g., epoxy) and contained (or housed) within an enclosure.

In various embodiments, the sensors within the intrinsically-safe sensor system include one or more microphones, and may also include, for example, one or more pressure sensors, one or more temperature sensors, one or more fluid flow sensors, one or more motion sensors (e.g., one or more gyroscopes, one or more accelerometers, and/or one or more magnetometers), one or more conductivity/resistivity sensors, and/or one or more capacitive sensors. In various embodiments, the microphone(s) include two or more microphones that are positioned such that the directionality of the sound waves recorded by the microphones can be determined. In addition, according to embodiments described herein, the port corresponding to each microphone is aligned with a through hole within the circuit board to which the microphone is attached; an elastomer tubing is compressed between an opening within a wall of the enclosure and the through hole within the circuit board to prevent the port of the microphone from being obstructed by the potting material; and the port of the microphone is acoustically coupled to the external environment via a metal fastener that extends through the opening within the wall of the enclosure, through the elastomer tubing, and within proximity to the through hole within the circuit board. In various embodiments, the acoustic coupling of the port of the microphone with the external environment via the metal fastener serves to dampen ambient sounds recorded by the microphone.

According to embodiments described herein, while the internal components of the intrinsically-safe sensor system are encapsulated in the potting material, the external connection region of the connector and the ports of the microphones are partially exposed to the external environment. Therefore, in various embodiments, the intrinsically-safe sensor system includes resistors that are electrically coupled to the connector, as well as resistors that are electrically coupled to the microphone. Such resistors serve to increase the overall intrinsic safety of the sensor system.

The method 1000 may begin at optional block 1002, at which the intrinsically-safe sensor system is attached to the source for which sound monitoring is desired, where the intrinsically-safe sensor includes the aforementioned components that are at least partially encapsulated within the potting material and contained within the enclosure. Such components include two or more microphone(s) that are positioned such that the directionality of sound waves recorded by the two or more microphones can be determined. In addition, each microphone is installed within the intrinsically-safe sensor system such that the microphone port is aligned with the through hole within the circuit board; the elastomer tubing is compressed between the opening within the wall of the enclosure and the through hole within the circuit board to prevent the microphone port from being obstructed by the potting material; and the microphone port is acoustically coupled to the source via the metal fastener that extends through the opening within the wall of the enclosure, through the elastomer tubing, and within proximity to the through hole within the circuit board.

In various embodiments, the source to which the intrinsically-safe sensor system is attached may be any type of equipment, vessel, or the like, that experiences conditions and/or events or interest, such as, in particular, sounds of interest. In various embodiments, the intrinsically-safe sensor system is attached to the source using straps, clamps, magnets, bolts, or any other suitable securing mechanism. Furthermore, in various embodiments, the source is located within an operational area that has been classified as a hazardous zone, and the intrinsically-safe sensor system has been certified for use in the hazardous zone.

At block 1004, sound emitted by the source is monitored using the microphone(s) of the intrinsically-safe sensor system. In addition, at block 1006, the directionality of the monitored sound is determined based, at least in part, on the positioning of the microphones within the intrinsically-safe sensor system. Furthermore, in various embodiments, the method 1000 also includes monitoring additional conditions of interest corresponding to the source using one or more additional types of sensors that are installed within the intrinsically-safe sensor system, as described herein. For example, such additional conditions of interest may include, but are not limited to, temperature, magnetism, vibration, pressure, flow rate, conductivity, resistivity, capacitance, and/or gyroscopic tilt.

The process flow diagram of FIG. 10 is not intended to indicate that the steps of the method 1000 are to be executed in any particular order, or that all of the steps of the method 1000 are to be included in every case. Further, any number of additional steps not shown in FIG. 10 may be included within the method 1000, depending on the details of the specific implementation. As an example, in various embodiments, the method 1000 also includes internally and/or externally connecting one or more additional devices to the intrinsically-safe sensor system using the internal connection region and/or the external connection region, respectively, of the connector. As another example, in various embodiments, the method 1000 also includes sending data to and receiving data from one or more remote computing systems (such as one or more remote control units that direct the operation of the intrinsically-safe sensor system) via the communication connection(s) of the intrinsically-safe sensor system.

Exemplary Method for Assembling Intrinsically-Safe Sensor System

Figure 11:
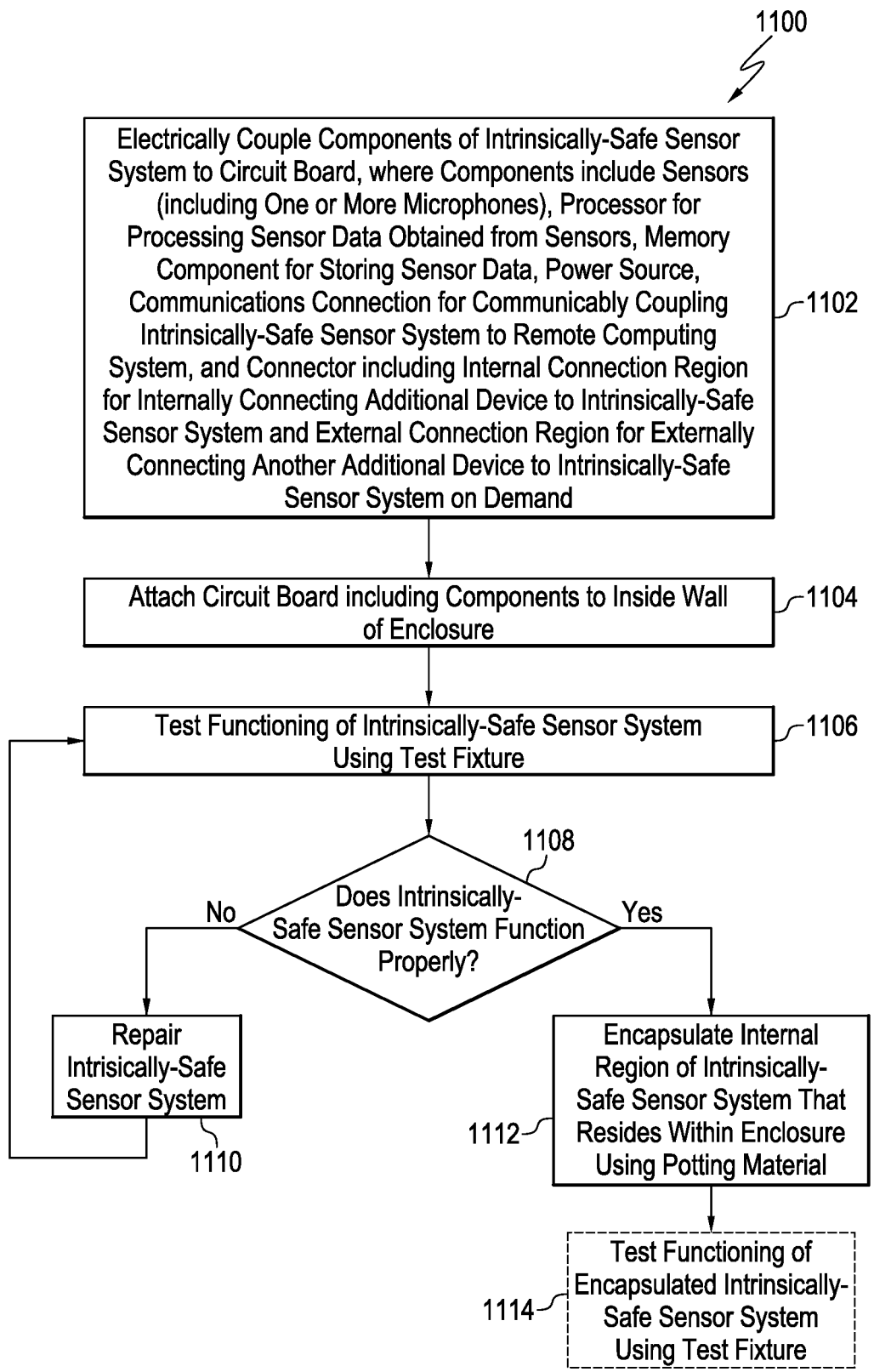
FIG. 11 is a process flow diagram of a method for assembling the intrinsically-safe sensor system described herein.

FIG. 11 is a process flow diagram of a method 1100 for assembling the intrinsically-safe sensor system described herein. The method begins at block 1102, at which the components of the intrinsically-safe sensor system are electrically coupled to a circuit board. As described herein, such components include a number of sensors (including at least one microphone), a processor for processing sensor data obtained from the sensors, a memory component for storing the sensor data obtained from the sensors, a power source, a communication connection for communicably coupling the intrinsically-safe sensor system to one or more remote computing systems, and a connector including an internal connection region for internally connecting an additional device to the intrinsically-safe sensor system and an external connection region for externally connecting another additional device to the intrinsically-safe sensor system on demand.

In various embodiments, the method 1100 also includes electrically coupling each microphone to the circuit board by aligning the microphone port with a through hole within the circuit board, compressing an elastomer tubing between an opening within the inside wall of the enclosure and a through hole within the circuit board to prevent the port of the microphone from being obstructed by the potting material, and acoustically coupling the port of the microphone to the external environment via a metal fastener that extends through the opening within the wall of the enclosure, through the elastomer tubing, and within proximity to the through hole within the circuit board. In addition, in various embodiments, the power source is a battery, and the method 1100 includes connecting a battery holder for the battery to the circuit board using a battery shim including a positioning mark for positioning and aligning the battery holder on the circuit board. Furthermore, in various embodiments, because at least a portion of the connector and at least a portion of the microphone(s) are exposed to the external environment rather than being encapsulated in the potting material, the method 1100 also includes electrically coupling resistors to the connector and the microphone(s) to increase the intrinsic safety of the intrinsically-safe sensor system, as described herein.

At block 1104, the circuit board including the components is attached to an inside wall of the enclosure of the intrinsically-safe sensor system. At block 1106, the test fixture described herein is used to test the functioning of the intrinsically-safe sensor system. A determination is then made at block 1108 about whether the intrinsically-safe sensor system functions properly. If the intrinsically-safe sensor system does not function properly, the method 1100 proceeds from block 1108 to block 1110, at which the intrinsically-safe sensor system is repaired, and the method 1100 then returns to block 1108 to test whether the intrinsically-safe sensor system now functions properly. However, if the intrinsically-safe sensor system does function properly, the method 1100 proceeds from block 1108 to block 1112, at which the internal region of the intrinsically-safe sensor system that resides within the enclosure is encapsulated using the potting material.

The process flow diagram of FIG. 11 is not intended to indicate that the steps of the method 1100 are to be executed in any particular order, or that all of the steps of the method 1100 are to be included in every case. Further, any number of additional steps not shown in FIG. 11 may be included within the method 1100, depending on the details of the specific implementation. As an example, in various embodiments, the method 1100 also includes optional block 1114, at which the functionality of the encapsulated intrinsically-safe sensor system is tested using the test fixture. In such embodiments, this test is used to ensure that the intrinsically-safe sensor system still functions properly after encapsulation with the potting material.

Moreover, it should be noted that, while embodiments are primarily described herein with respect to hazardous zones within the oil and gas industry, this is for ease of discussion only. In practice, the sensor system described herein is not limited to use within such hazardous zones but, rather, may be effectively utilized to monitor conditions within areas that are not classified as hazardous zones. For example, the sensor system may be used to monitor conditions with respect to wellheads, pumps, valves, process equipment, pipelines, upstream surface equipment, refinery equipment, and/or chemical plant equipment that are not within areas that are classified as hazardous zones. Furthermore, while embodiments are primarily described herein with respect to the oil and gas industry, this is for ease of discussion only. In practice, the sensor system described herein is not limited to applications within the oil and gas industry but, rather, may be used to detect and/or monitor any suitable types of conditions and/or events with respect to any suitable types of areas, indiscriminately of the industry and/or application for which it is applied. Specific, non-limiting examples of different industries for which the sensor system can be utilized include the farming industry, the automobile industry, the manufacturing industry, the food processing industry, and/or the aerospace industry.

Exemplary Embodiments of Present Techniques

In one or more embodiments, the present techniques may be susceptible to various modifications and alternative forms, such as the following embodiments as noted in paragraphs 1 to 20:

1. An intrinsically-safe sensor system, including: a number of sensors, including a microphone; a processor for processing sensor data obtained from the sensors; a memory component for storing the sensor data obtained from the sensors; a power source; a communication connection for communicably coupling the intrinsically-safe sensor system to a remote computing system; a connector comprising an internal connection region for internally connecting an additional device to the intrinsically-safe sensor system and an external connection region for externally connecting another additional device to the intrinsically-safe sensor system on demand; an enclosure; and potting material for encapsulating an internal region of the intrinsically-safe sensor system that resides within the enclosure.

2. The intrinsically-safe sensor system of paragraph 1, where a port of the microphone is aligned with a through hole within a circuit board to which the microphone is attached, where an elastomer tubing is compressed between an opening within a wall of the enclosure and the through hole within the circuit board to prevent the port of the microphone from being obstructed by the potting material, and where the port of the microphone is acoustically coupled to the external environment via a metal fastener that extends through the opening within the wall of the enclosure, through the elastomer tubing, and within proximity to the through hole within the circuit board.

3. The intrinsically-safe sensor system of paragraph 2, where the acoustic coupling of the port of the microphone with the external environment via the metal fastener serves to dampen ambient sounds recorded by the microphone.

4. The intrinsically-safe sensor system of any of paragraphs 1 to 3, where the sensors include two or more microphones that are positioned such that the directionality of sound waves recorded by the two or more microphones can be determined.

5. The intrinsically-safe sensor system of any of paragraphs 1 to 4, where proper functioning of the intrinsically-safe sensor system is verified using a test fixture before the internal region of the intrinsically-safe sensor system is encapsulated using the potting material.

6. The intrinsically-safe sensor system of any of paragraphs 1 to 5, where the connector is fully configurable and supports a number of communication protocols for connecting any of a number of additional devices to the intrinsically-safe sensor system.

7. The intrinsically-safe sensor system of any of paragraphs 1 to 6, where at least a portion of the connector and at least a portion of the microphone are exposed to an external environment rather than being encapsulated in the potting material, and where the intrinsically-safe sensor system includes resistors that are electrically coupled to the connector and resistors that are electrically coupled to the microphone to increase the intrinsic safety of the intrinsically-safe sensor system.

8. The intrinsically-safe sensor system of any of paragraphs 1 to 7, where the power source includes a battery, where the battery is installed within the intrinsically-safe sensor system using a battery shim on a circuit board of the intrinsically-safe sensor system, and where the battery shim includes a positioning mark for positioning and aligning a battery holder for the battery on the circuit board.

9. The intrinsically-safe sensor system of any of paragraphs 1 to 8, where the sensors further include at least one of a pressure sensor, a temperature sensor, a fluid flow sensor, a motion sensor, a conductivity/resistivity sensor, or a capacitive sensor.

10. The intrinsically-safe sensor system of any of paragraphs 1 to 9, where the intrinsically-safe sensor system includes updatable firmware and configuration parameters, and where the intrinsically-safe sensor system updates the updatable firmware and configuration parameters in response to input received from the remote computing system via the communication connection.

11. A method for monitoring sound corresponding to a source using an intrinsically-safe sensor system, the method including: attaching an intrinsically-safe sensor system to a source for which sound monitoring is desired, where the intrinsically-safe sensor system includes components that are at least partially encapsulated within potting material and contained within an enclosure, where the components include two or more microphones that are positioned such that a directionality of sound waves recorded by the two or more microphones can be determined, and where each microphone is installed within the intrinsically-safe sensor system such that a port of the microphone is aligned with a through hole within a circuit board to which the microphone is attached, where an elastomer tubing is compressed between an opening within a wall of the enclosure and the through hole within the circuit board to prevent the port of the microphone from being obstructed by the potting material, and where the port of the microphone is acoustically coupled to the source via a metal fastener that extends through the opening within the wall of the enclosure, through the elastomer tubing, and within proximity to the through hole within the circuit board; monitoring sound emitted by the source using the two or more microphones of the intrinsically-safe sensor system; and determining the directionality of the sound based, at least in part, on the positioning of the two or more microphones.

12. The method of paragraph 11, including installing each microphone within the intrinsically-safe sensor system by: aligning the port of the microphone with the through hole within the circuit board; compressing the elastomer tubing between the opening within the wall of the enclosure and the through hole within the circuit board to prevent the port of the microphone from being obstructed by the potting material; and acoustically coupling the port of the microphone to the external environment via the metal fastener that extends through the opening within the wall of the enclosure, through the elastomer tubing, and within proximity to the through hole within the circuit board.

13. The method of paragraph 11 or 12, where the intrinsically-safe sensor system includes a connector comprising an internal connection region for internally connecting an additional device to the intrinsically-safe sensor system and an external connection region for externally connecting another additional device to the intrinsically-safe sensor system on demand, and where the method further includes connecting at least one additional device to the intrinsically-safe sensor system using the connector.

14. The method of any of paragraphs 11 to 13, where the intrinsically-safe sensor system includes a communication connection, and where the method further includes sending data to and receiving data from at least one remote computing system via the communication connection.

15. The method of any of paragraphs 11 to 14, further including monitoring additional conditions of interest corresponding to the source using at least one additional type of sensor that is installed within the intrinsically-safe sensor system.

16. The method of paragraph 15, wherein the one or more additional conditions interest are selected from the group consisting of temperature, magnetism, vibration, pressure, flow rate, conductivity, resistivity, capacitance, gyroscopic tilt, or combinations thereof.

17. The method of any of paragraphs 11 to 16, further including providing power to the intrinsically-safe sensor system by installing a battery using a battery shim including a positioning mark for positioning and aligning a battery holder for the battery on a circuit board of the intrinsically-safe sensor system.

18. A method for assembling an intrinsically-safe sensor system, including: electrically coupling components of the intrinsically-safe sensor system to a circuit board, where the components include: a number of sensors, including at least one microphone; a processor for processing sensor data obtained from the sensors; a memory component for storing the sensor data obtained from the sensors; a power source; a communication connection for communicably coupling the intrinsically-safe sensor system to a remote computing system; and a connector comprising an internal connection region for internally connecting an additional device to the intrinsically-safe sensor system and an external connection region for externally connecting another additional device to the intrinsically-safe sensor system on demand; attaching the circuit board including the components to an inside wall of an enclosure; determining whether the intrinsically-safe sensor system functions properly using a test fixture; if the intrinsically-safe sensor system does not function properly, repairing the intrinsically-safe sensor system and repeating the determination of whether the intrinsically-safe sensor system functions properly using the test fixture; and if the intrinsically-safe sensor system does function properly, encapsulating an internal region of the intrinsically-safe sensor system that resides within the enclosure using potting material.

19. The method of paragraph 18, where at least a portion of the connector and at least a portion of the least one microphone are exposed to an external environment rather than being encapsulated in the potting material, and where the method further includes electrically coupling resistors to the connector and electrically coupling resistors to the least one microphone to increase the intrinsic safety of the intrinsically-safe sensor system.

20. The method of paragraph 18 or 19, including electrically coupling the least one microphone to the circuit board by: aligning a port of the microphone with a through hole within the circuit board; compressing an elastomer tubing between an opening within the inside wall of the enclosure and a through hole within the circuit board to prevent the port of the microphone from being obstructed by the potting material; and acoustically coupling the port of the microphone to an external environment via a metal fastener that extends through the opening within the wall of the enclosure, through the elastomer tubing, and within proximity to the through hole within the circuit board.

21. The method of any of paragraphs 18 to 20, wherein the power source includes a battery, and wherein the method includes connecting a battery holder for the battery to the circuit board using a battery shim including a positioning mark for positioning and aligning the battery holder on the circuit board.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present techniques may be modified and practiced in different but equivalent manners apparent to those skilled in the art having the benefit of the teachings herein. Furthermore, no limitations are intended to the details of formulation, construction, or design herein shown, other than as described in the claims below. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present techniques include all alternatives, modifications, and equivalents falling within the true spirit and scope of the appended claims.

What is claimed is:

1. An intrinsically-safe sensor system, comprising:
a plurality of sensors, comprising a microphone;
a processor for processing sensor data obtained from the plurality of sensors;
a memory component for storing the sensor data obtained from the plurality of sensors;
a power source;
a communication connection for communicably coupling the intrinsically-safe sensor system to a remote computing system;
a connector comprising an internal connection region for internally connecting an additional device to the intrinsically-safe sensor system and an external connection region for externally connecting another additional device to the intrinsically-safe sensor system on demand;
an enclosure; and
potting material for encapsulating an internal region of the intrinsically-safe sensor system that resides within the enclosure;
wherein:
   a) proper functioning of the intrinsically-safe sensor system is verified using a test fixture before the internal region of the intrinsically-safe sensor system is encapsulated using the potting material;
   b) at least a portion of the connector and at least a portion of the microphone are exposed to an external environment rather than being encapsulated in the potting material, and wherein the intrinsically-safe sensor system comprises resistors that are electrically coupled to the connector and resistors that are electrically coupled to the microphone to increase the intrinsic safety of the intrinsically-safe sensor system;
   c) the power source comprises a battery, wherein the battery is installed within the intrinsically-safe sensor system using a battery shim on a circuit board of the intrinsically-safe sensor system, and wherein the battery shim comprises a positioning mark for positioning and aligning a battery holder for the battery on the circuit board; or
   d) the intrinsically-safe sensor system comprises updatable firmware and configuration parameters, and wherein the intrinsically-safe sensor system updates the updatable firmware and configuration parameters in response to input received from the remote computing system via the communication connection.

2. The intrinsically-safe sensor system of claim 1, wherein the plurality of sensors comprises two or more microphones that are positioned such that a directionality of sound waves recorded by the two or more microphones can be determined.

3. The intrinsically-safe sensor system of claim 1, wherein the connector is fully configurable and supports a plurality of communication protocols for connecting any of a plurality of additional devices to the intrinsically-safe sensor system.

4. The intrinsically-safe sensor system of claim 1, wherein the plurality of sensors further comprises at least one of a pressure sensor, a temperature sensor, a fluid flow sensor, a motion sensor, a conductivity/resistivity sensor, or a capacitive sensor.

5. An intrinsically-safe sensor system, comprising:
a plurality of sensors, comprising a microphone;
a processor for processing sensor data obtained from the plurality of sensors;
a memory component for storing the sensor data obtained from the plurality of sensors;
a power source;
a communication connection for communicably coupling the intrinsically-safe sensor system to a remote computing system;
a connector comprising an internal connection region for internally connecting an additional device to the intrinsically-safe sensor system and an external connection region for externally connecting another additional device to the intrinsically-safe sensor system on demand;
an enclosure; and
potting material for encapsulating an internal region of the intrinsically-safe sensor system that resides within the enclosure;
wherein a port of the microphone is aligned with a through hole within a circuit board to which the microphone is attached, wherein an elastomer tubing is compressed between an opening within a wall of the enclosure and the through hole within the circuit board to prevent the port of the microphone from being obstructed by the potting material, and wherein the port of the microphone is acoustically coupled to the external environment via a metal fastener that extends through the opening within the wall of the enclosure, through the elastomer tubing, and within proximity to the through hole within the circuit board.

6. The intrinsically-safe sensor system of claim 5, wherein the acoustic coupling of the port of the microphone with the external environment via the metal fastener serves to dampen ambient sounds recorded by the microphone.

7. A method for monitoring sound corresponding to a source using an intrinsically-safe sensor system, the method comprising:
attaching an intrinsically-safe sensor system to a source for which sound monitoring is desired, wherein the intrinsically-safe sensor system comprises components that are at least partially encapsulated within potting material and contained within an enclosure, wherein the components comprise two or more microphones that are positioned such that a directionality of sound waves recorded by the two or more microphones can be determined; and wherein each microphone is installed within the intrinsically-safe sensor system such that a port of the microphone is aligned with a through hole within a circuit board to which the microphone is attached, wherein an elastomer tubing is compressed between an opening within a wall of the enclosure and the through hole within the circuit board to prevent the port of the microphone from being obstructed by the potting material, and wherein the port of the microphone is acoustically coupled to the source via a metal fastener that extends through the opening within the wall of the enclosure, through the elastomer tubing, and within proximity to the through hole within the circuit board;
monitoring sound emitted by the source using the two or more microphones of the intrinsically-safe sensor system; and
determining the directionality of the sound based, at least in part, on the positioning of the two or more microphones.

8. The method of claim 7, comprising installing each microphone within the intrinsically-safe sensor system by:
aligning the port of the microphone with the through hole within the circuit board;
compressing the elastomer tubing between the opening within the wall of the enclosure and the through hole within the circuit board to prevent the port of the microphone from being obstructed by the potting material; and
acoustically coupling the port of the microphone to the external environment via the metal fastener that extends through the opening within the wall of the enclosure, through the elastomer tubing, and within proximity to the through hole within the circuit board.

9. The method of claim 7, wherein the intrinsically-safe sensor system comprises a connector comprising an internal connection region for internally connecting an additional device to the intrinsically-safe sensor system and an external connection region for externally connecting another additional device to the intrinsically-safe sensor system on demand, and wherein the method further comprises connecting at least one additional device to the intrinsically-safe sensor system using the connector.

10. The method of claim 7, wherein the intrinsically-safe sensor system comprises a communication connection, and wherein the method further comprises sending data to and receiving data from at least one remote computing system via the communication connection.

11. The method of claim 7, further comprising monitoring one or more additional conditions of interest corresponding to the source using at least one additional type of sensor that is installed within the intrinsically-safe sensor system.

12. The method of claim 11, wherein the one or more additional conditions of interest are selected from the group consisting of temperature, magnetism, vibration, pressure, flow rate, conductivity, resistivity, capacitance, gyroscopic tilt, and combinations thereof.

13. The method of claim 7, further comprising providing power to the intrinsically-safe sensor system by installing a battery using a battery shim comprising a positioning mark for positioning and aligning a battery holder for the battery on a circuit board of the intrinsically-safe sensor system.

14. A method for assembling an intrinsically-safe sensor system, comprising:
electrically coupling components of the intrinsically-safe sensor system to a circuit board, wherein the components comprise:
a plurality of sensors, comprising at least one microphone;
a processor for processing sensor data obtained from the plurality of sensors;
a memory component for storing the sensor data obtained from the plurality of sensors;
a power source;
a communication connection for communicably coupling the intrinsically-safe sensor system to a remote computing system; and a connector comprising an internal connection region for internally connecting an additional device to the intrinsically-safe sensor system and an external connection region for externally connecting another additional device to the intrinsically-safe sensor system on demand;

attaching the circuit board comprising the components to an inside wall of an enclosure;

determining whether the intrinsically-safe sensor system functions properly using a test fixture;

if the intrinsically-safe sensor system does not function properly, repairing the intrinsically-safe sensor system and repeating the determination of whether the intrinsically-safe sensor system functions properly using the test fixture; and if the intrinsically-safe sensor system does function properly, encapsulating an internal region of the intrinsically-safe sensor system that resides within the enclosure using potting material.

15. The method of claim 14, wherein at least a portion of the connector and at least a portion of the least one microphone are exposed to an external environment rather than being encapsulated in the potting material, and wherein the method further comprises electrically coupling resistors to the connector and electrically coupling resistors to the least one microphone to increase the intrinsic safety of the intrinsically-safe sensor system.

16. The method of claim 14, comprising electrically coupling the at least one microphone to the circuit board by:
    aligning a port of the microphone with a through hole within the circuit board;
    compressing an elastomer tubing between an opening within the inside wall of the enclosure and the through hole within the circuit board to prevent the port of the microphone from being obstructed by the potting material; and
    acoustically coupling the port of the microphone to an external environment via a metal fastener that extends through the opening within the wall of the enclosure, through the elastomer tubing, and within proximity to the through hole within the circuit board.

17. The method of claim 14, wherein the power source comprises a battery, and wherein the method comprises connecting a battery holder for the battery to the circuit board using a battery shim comprising a positioning mark for positioning and aligning the battery holder on the circuit board.

* * * * *